C. F. VAUGHAN.
GREASE CUP.
APPLICATION FILED AUG. 25, 1921.

1,426,929.

Patented Aug. 22, 1922.

INVENTOR
Charles Frederic Vaughan
PER
ATTORNEY

UNITED STATES PATENT OFFICE.

CHARLES FREDERIC VAUGHAN, OF LONDON, ENGLAND.

GREASE CUP.

1,426,929.  Specification of Letters Patent.  Patented Aug. 22, 1922.

Application filed August 25, 1921. Serial No. 495,207.

(GRANTED UNDER THE PROVISIONS OF THE ACT OF MARCH 3, 1921, 41 STAT. L., 1313.)

*To all whom it may concern:*

Be it known that I, CHARLES FREDERIC VAUGHAN, a subject of the King of England, residing at 47 Streatham Hill, London, England, S. W. 2., have invented new and useful Improvements in Grease Cups (for which I have filed application in England May 26, 1915, Patent Number 7821), of which the following is a specification.

This invention relates to grease cups and greaser bolts and it has for its object to avoid the grease passing out between the threads of the cap and the cup, and to provide an effective grease cup or greaser bolt.

According to this invention, the cap of the grease cup is provided with an inwardly protruding cylindrical flange adapted to fit closely the inner bore of the cup, and either attached to the cap or formed integrally with it. Preferably the cylindrical flange is split lengthwise and is arranged to exert a resilient pressure on the sides of the cup.

In the accompanying drawings.

The cup A at its lower end is provided with a nipple $A^2$ by which the cup may be screwed into its position, and with hexagonal faces or a nut $A^3$ for engagement by a spanner during this process. The cup A is externally screw threaded at $A^4$ for the reception of a cap B, and is internally formed with a plain cylindrical surface or bore $A^5$.

The cap B is internally screw threaded to correspond with the external screw threading of the cup and an inwardly protruding cylindrical flange C is provided centrally within the cap B so that when the latter is screwed into position upon the cup A, the cylindrical flange C closely fits and slides within the cup. By such means the grease, on the rotation of the cap B, is forced into the bearing and does not pass out between the threads. The cap B may have a milled edge or hexagonal faces at $B^2$ to facilitate screwing up and down on the cup.

If desired the inwardly protruding cylindrical flange C aforesaid may be in one piece with the cap, or it may be mounted in the cap B as a separate part. In the latter case the construction shown in Figure 1 may be employed, in which the head of the cap B is drilled through and is there provided with an internal screw thread. This latter is engaged by the small cap $C^2$ integrally provided with the downwardly extending cylindrical part C and is formed at its upper end as a nut $C^3$. The cap $C^2$ is screwed into position within the main cap B so that the lower extremity of the cylindrical flange C may, for example, protrude to a length corresponding to the length of the cap.

Figure 2:
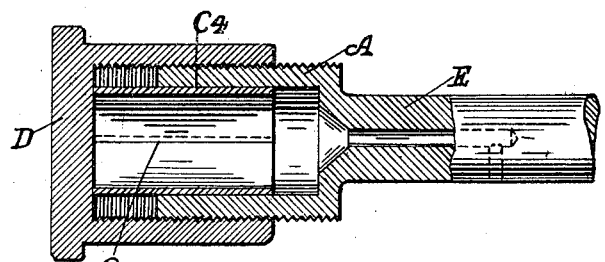
Figure 2 is a part-sectional elevation shewing the grease cup formed integrally with a shackle pin.

Alternatively the cylindrical flange C may take the form of a thin tube $C^4$ and may be soldered into position upon the main cap D as illustrated in Figure 2, or the cylindrical flange C may be provided integrally with the cap D.

To ensure a close fit of the cylindrical flange $C^4$ in the cup A it is preferably split longitudinally at $C^5$, the adjacent edges overlapping to prevent a leakage of grease into the annular space between it and the walls of the cap D, and the sides of the flange $C^4$ are caused to exert a resilient outward pressure upon the cup, the expansion of the flange C or $C^4$ being increased by pressure upon the grease or oil within the cup formed by the flange C or $C^4$. This obviates risk of the cap becoming unscrewed accidentally, as well as minimizing or preventing leakage.

Figure 1:
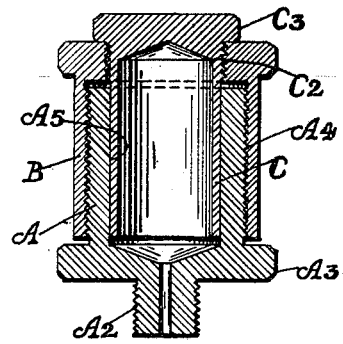
Figure 1 is a sectional elevation of a grease cup suitable for general use upon bearings.

In the construction shown in Figure 1, the flange C might also, if desired, be slit longitudinally and sprung apart slightly at the split to cause a similar resilient grip upon the cup A. The gap caused by the split may be protected by a covering, if desired, to prevent leakage.

Figure 3:
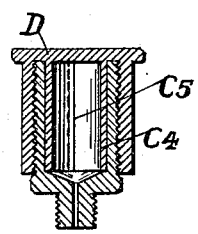
Figure 3 is a sectional elevation of a grease cup of modified construction.

For use upon the shackle pins of suspension springs or for like purposes, the cup A may be formed integrally with a pin E as shewn by Figure 2, and the cap with its cylindrical internal flange may be constructed either as shewn in Figure 1 or as shewn in Figure 3.

What I claim as my invention and desire to secure by Letters Patent of the United States is:—

In a grease cup the combination of a cup-shaped body part having a cylindrical recess, a discharge conduit at the base of said recess, an interiorly threaded cap adapted to engage the threaded outer surface of the said body part, and a cylindrical flange attached to the said cap, and arranged to extend into the said recess closely fitted against the walls thereof, the said flange being of the same length as the said cap, and being longitudinally divided, the edges of the divided flange overlapping each other.

In testimony whereof I have signed my name to this specification in the presence of two subscribing witnesses.

CHARLES FREDERIC VAUGHAN.

Witnesses:
 HUGH WILLIAM VAUGHAN,
 G. V. BONNIWELL.